(12) United States Patent
Grossi et al.

(10) Patent No.: US 9,513,911 B2
(45) Date of Patent: Dec. 6, 2016

(54) METHOD OF DETECTING STACK OVERFLOWS AND PROCESSOR FOR IMPLEMENTING SUCH A METHOD

(71) Applicant: THALES, Neuilly-sur-Seine (FR)

(72) Inventors: Philippe Grossi, Saint Marcel les Valence (FR); Dominique David, Neuilly-sur-Seine (FR); Francois Brun, Neuilly-sur-Seine (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/550,834

(22) Filed: Nov. 21, 2014

(65) Prior Publication Data
US 2015/0150024 A1 May 28, 2015

(30) Foreign Application Priority Data

Nov. 22, 2013 (FR) ..................................... 13 02695

(51) Int. Cl.
*G06F 9/46* (2006.01)
*G06F 9/30* (2006.01)
*G06F 9/48* (2006.01)
*G06F 9/50* (2006.01)
*G06F 21/52* (2013.01)

(52) U.S. Cl.
CPC ........... *G06F 9/30134* (2013.01); *G06F 9/462* (2013.01); *G06F 9/4843* (2013.01); *G06F 9/5016* (2013.01); *G06F 21/52* (2013.01)

(58) Field of Classification Search
USPC ....................................................... 718/108
See application file for complete search history.

(56) References Cited

U.S. PATENT DOCUMENTS

| 4,530,049 | A | * | 7/1985 | Zee | ....................... G06F 9/4426 711/132 |
|---|---|---|---|---|---|
| 4,835,738 | A | * | 5/1989 | Niehaus | .................... G06F 9/22 711/154 |
| 6,526,463 | B1 | * | 2/2003 | Ding | .................... G06F 9/30043 710/260 |
| 2007/0118724 | A1 | * | 5/2007 | Patel | .................... G06F 9/30174 712/202 |
| 2008/0163176 | A1 | * | 7/2008 | Krauss | ................ G06F 11/3612 717/128 |
| 2008/0168460 | A1 | * | 7/2008 | Lee | ....................... G06F 9/5016 718/104 |

(Continued)

FOREIGN PATENT DOCUMENTS

WO 9909469 A1 2/1999

*Primary Examiner* — Marina Lee
(74) *Attorney, Agent, or Firm* — Baker & Hostetler LLP

(57) ABSTRACT

A method of detecting stack overflows includes the following steps: storing in at least one dedicated register at least one data item chosen from: a data item (SPHaut) indicating a maximum permitted value for a stack pointer, and a data item (SPBas) indicating a minimum permitted value for said stack pointer; effecting a comparison between a current value (SP) or past value (SPMin, SPMax) of said stack pointer and said data item or each of said data items; and generating a stack overflow exception if said comparison indicates that said current or past value of said stack pointer is greater than said maximum permitted value or less than said minimum permitted value. A processor for implementing such a method is also provided.

8 Claims, 3 Drawing Sheets

(56) References Cited

U.S. PATENT DOCUMENTS

| | | | |
|---|---|---|---|
| 2010/0174893 A1* | 7/2010 | Rivera | G06F 9/38 712/244 |
| 2014/0075165 A1* | 3/2014 | Chen | G06F 9/322 712/233 |
| 2015/0150024 A1* | 5/2015 | Grossi | G06F 9/30134 718/108 |

* cited by examiner

METHOD OF DETECTING STACK OVERFLOWS AND PROCESSOR FOR IMPLEMENTING SUCH A METHOD

CROSS-REFERENCE TO RELATED APPLICATION

This application claims priority to foreign French patent application No. FR 1302695, filed on Nov. 22, 2013, the disclosure of which is incorporated by reference in its entirety.

FIELD OF THE INVENTION

The invention relates to a method of detecting stack overflows and to a processor for implementing such a method.

BACKGROUND

Programs written in high-level languages (C, C++, ADA, etc.) require data stacks to isolate the local variables of each function. Generally, for a given thread or process, there is only one stack ("call stack") and it grows on each interleaving of functions, and then shrinks when a function terminates (return). The memory of a computer generally stores a plurality of stacks, one for each thread or process.

A problem frequently encountered with stacks is the overflowing or the space allocated to one of them, mainly because of programming errors (unlimited recursive loops, unexpected branches, etc.) or functional defects (incorrect analysis of the stack size, insufficient memory allocation, etc.). Overflows may also occur when using data the size of which is known only on compilation (constructions with non-constrained types, mainly in the ADA language).

When such an overflow occurs, a process being executed writes outside the memory area that is allocated to its stack, usually in the area allocated to the stack of another process. Such a problem is difficult to detect and to analyze when it shows up after a delay, when the process the stack of which has been corrupted is activated.

For reasons of optimization of the generated code, the stack overflow is not conventionally managed by compilers.

In the past, some ADA compilers stored in a generic register a maximum permitted value for the stack pointer and verified after the prologue of each function—and therefore just after stack allocation—that the stack pointer had not exceeded that maximum permitted value. This solution was costly in terms of execution time and did not provide complete protection against the risks of overflow. Moreover, it provided no assistance to the programmer in sizing the stacks so as to avoid overflow errors.

Another known prior art method for managing overflow errors consists in using the memory management units (MMU) generally present in modern central processing units (CPU). The principle of this technique consists in creating a guard space around the memory area allocated to the stack, that is to say a small space (usually of 4 kB) before and after the stack area, read/write access to which is prohibited. If the stack pointer overflows, the application attempts to read or write in this prohibited area and produces a page error (program exception). This technique has a number of disadvantages:

it necessitates an MMU, which is a costly hardware unit, is not present in all processors, and is notably absent in many "onboard" processors;

programming the MMU is costly and constraining (for this reason, this unit is usually deactivated for most application software);

the protection obtained is not absolute: for example, if the local stack of a function reserves a large quantity of memory that is not used, it is possible to pass over the guard space and to carry on in a space to which access is authorized although it is not allocated to the stack.

It should furthermore be noted that MMU are not provided for such an application, which constitutes a kind of "trap".

In order to assist with sizing stacks, it is also known to write a known pattern in the memory cells allocated to the stack. After execution of a test program, the memory is examined to determine at what "level" of the stack this pattern has been overwritten by write operations. This technique is costly to implement and can be applied only in the development phase. It cannot manage or even detect the overflow, but reduces the probability that they will occur by allowing memory allocation better suited to the real requirements of processes.

SUMMARY OF THE INVENTION

The invention aims to remedy at least some of the aforementioned disadvantages of the prior art. To be more precise, the invention aims to provide a method of detecting stack overflows—and more particularly overflows of the call stack—that is simple to implement, not significantly slowing the execution of programs and not necessitating complex hardware units. A method in accordance with the invention employs both hardware means—that are relatively simple—and software means. In one embodiment of the invention, stack overflows are detected as soon as they occur, which makes it possible to minimize their consequences. In accordance with another embodiment of the invention, the method further provides data that can assist the developer in sizing the stacks. These two embodiments may advantageously be combined. The invention also aims to provide a processor comprising hardware means for implementing such a method.

One aspect of the invention consists in a method of detecting stack overflows—and more particularly overflows of the call stack—including the following steps:

A. storing in at least one dedicated register at least one data item chosen from: a data item indicating a maximum permitted value for a stack pointer, and a data item indicating a minimum permitted value for said stack pointer;

B. effecting a comparison between a current or past value of said stack pointer and said data item or each of said data items; and C. generating a stack overflow exception if said comparison indicates that said current or past value of said stack pointer is greater than said maximum permitted value or less than said minimum permitted value.

In accordance with different embodiments of the invention:

Said step A may include storing in two dedicated registers a data item indicating a maximum permitted value for a stack pointer and a data item indicating a minimum permitted value for said stack pointer and said step B includes at least one comparison between the value of said stack pointer and each data item.

The method may also include the following steps:

A1: storing in at least one other dedicated register at least one data item chosen from: a data item indicating a maximum value assumed by a stack pointer during the execution of a thread or process and a data item indicating a minimum value assumed by said stack pointer during the execution of said thread or process;

B1: updating said data items during the execution of said thread or process.

Said step A1 may include storing in two dedicated registers a data item indicating a maximum value assumed by said stack pointer during the execution of said thread or process and a data item indicating a minimum value assumed by said stack pointer during the execution of said thread or process.

Said step A1 may be implemented by an operating system at the time of the activation of said thread or process and said step B1 implemented by a hardware processor module at the time of the execution of said thread or process.

Said step A may be implemented by an operating system at the time of the activation of a thread or process and said steps B and C may be implemented by said operating system at the time of context switching for the suspension of said thread or process and the activation of another thread or process and comprise at least one comparison chosen from: a comparison between said data item indicating a maximum permitted value for a stack pointer and said maximum value assumed by said stack pointer at the time of the execution of the thread or process currently suspended and a comparison between said data item indicating a minimum permitted value for a stack pointer and said minimum value assumed by said stack pointer at the time of the execution of said thread or process currently suspended.

Said step A may be implemented by an operating system at the time of the activation of a thread or process and said steps B and C may be implemented by a hardware processor module at the time of the execution of said thread or process, said step B comprising a comparison between a current value of said stack pointer and said data item or each of said data items.

At the time of the activation of a thread or process, said operating system may recover from the context of a thread or process to be activated said data item or each of said data items to be stored in said dedicated register or each of said dedicated registers and at the time of context switching for the suspension of said thread or process and the activation of another thread or process said operating system may save said data item or each of said data items stored in one of said dedicated registers in the context of said thread or process currently suspended.

The method may employ a first set of said dedicated registers and an equivalent second set of dedicated registers, and: at the time of the activation of a thread or process intended to be executed in user mode, at least said step A may be implemented by an operating system operating in supervisor mode and using the dedicated register or registers of said first set; and at the time of the activation of a thread or process intended to be executed in supervisor mode, at least said step A may be implemented by an operating system operating in hypervisor mode and using the dedicated register or registers of said second set.

The invention also consists in a processor for implementing such a method, including: a central processor unit; at least one register for storing a stack pointer; at least one dedicated register for storing at least one data item chosen from: a data item indicating a maximum permitted value for said stack pointer and a data item indicating a minimum permitted value for said stack pointer; and a hardware processor module configured to effect a comparison between a current value of said stack pointer and said data item or each of said data items and to generate a stack overflow exception if said comparison indicates that said current value of said stack pointer is greater than said maximum permitted value or less than said minimum permitted value.

The invention further consists in a processor for implementing such a method, including: a central processor unit; at least one register for storing a stack pointer; at least one dedicated register for storing at least one data item chosen from: a data item indicating a maximum permitted value for said stack pointer and a data item indicating a minimum permitted value for said stack pointer; and at least one dedicated register for storing at least one data item chosen from: a data item indicating a maximum value assumed by a stack pointer during the execution of a current thread or process and a data item indicating a minimum value assumed by said stack pointer during the execution of said current thread or process; and a hardware processor module configured to update said data items during the execution of said thread or process.

BRIEF DESCRIPTION OF THE DRAWINGS

Other features, details and advantages of the invention will emerge on reading the description given with reference to the appended drawings, which are provided by way of example and represent.

DETAILED DESCRIPTION

Figure 1:
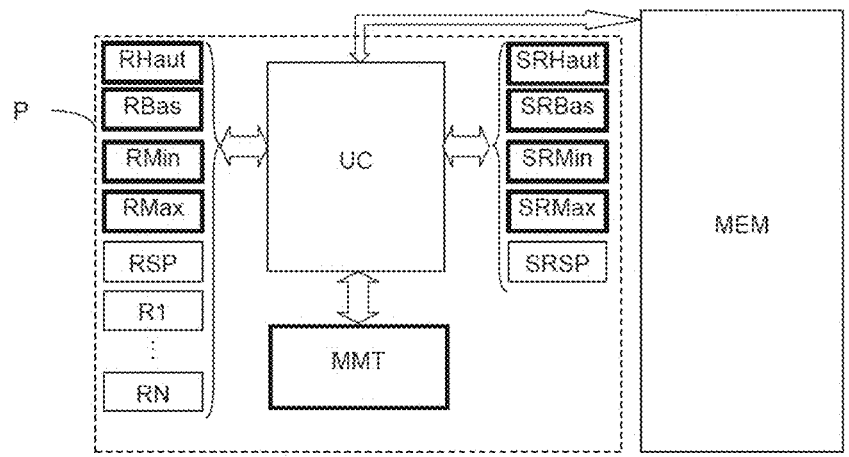
In FIG. 1, a simplified functional schematic of a processor in accordance with one embodiment of the invention.

The processor P in FIG. 1 includes—in a conventional manner—a central processor unit UC exchanging data with a memory MEM (which in this instance is not part of the processor itself), a set of N "generic" registers R1-RN and two registers RSP and SRSP for storing a stack pointer for the processes executed in user mode and in supervisor mode, respectively. The processor also includes two sets of dedicated registers used to detect stack overflows: a first set comprising the registers RHaut, RBas, RMin and RMax, for the user mode, and a second set comprising the registers SRHaut, SRBas, SRMin and SRMax, for the supervisor mode; as well as a hardware processor module MMT, shown as a separate component but which may in fact be integrated into the central processor unit. In the FIG. 1 embodiment, all exchanges of data are effected via the central processor unit UC; alternatively, data could be exchanged directly between the dedicated registers and the hardware processor module MMT and/or the memory MEM.

Each of the dedicated registers must have a size at least equal to that of the stack pointer SP/SSP.

The processor P may be a single-core or multiple-core processor and be produced as a dedicated integrated circuit or synthesized from programmable logic components such as CPLD or FPGA.

The register RHaut (SRHaut in supervisor mode) is intended to contain a data item—hereinafter indicated SPHaut—indicating a maximum permitted value for the stack pointer SP; in practice, this will usually be the maximum value of SP not producing any "top down" stack overflow. The register RBas (SRBas in supervisor mode) is intended to contain a data item—hereinafter indicated SPBas—indicating a minimum permitted value for the stack pointer SP; in practice, it will usually be the minimum value of SP not producing any "bottom up" stack overflow. The values of SPHaut and SPBas are initialized when allocating the stack. These values are not modified during the execution of a thread or process (referred to hereinafter simply as a "process"), but only on switching context; this will be explained in more detail later, with reference to FIGS. 3A and 3B.

The register RMax (SRMax in supervisor mode) is intended to contain a data item—hereinafter indicated SPMax—indicating a maximum value assumed by the stack pointer SP during the execution of the process (in practice, it will usually be the maximum value itself). The register RMin (SRMin in supervisor mode) is intended to contain a data item—hereinafter indicated SPMin—indicating a minimum value assumed by the stack point SP during the execution of the process (in practice, it will usually be the minimum value itself). The values SPMax and SPMin are updated continually during the execution of a process.

It should be noted that a processor in accordance with the invention need not necessarily comprise all the eight dedicated registers shown in FIG. 1. In fact, different embodiments of a method in accordance with the invention may use only one set of registers (generally the first, intended for the management of overflows caused by processes executed in user mode), or even an incomplete set, comprising only the pair of registers RHaut/RBas (or SRHaut/SRBas) or the pair RMax/RMin (or SRMax/SRMin). Moreover, if it is known that only a "bottom up" stack overflow is likely to occur, it may be sufficient to provide the register RHaut and/or the register RMax (SRHaut and/or SRMax in the case of processes executed in supervisor mode). In a reciprocal manner, if it is known that only a "top down" stack overflow is likely to occur, it may be sufficient to provide the register RBas and/or the register RMin (SRBas and/or SRMin in the case of processes executed in supervisor mode). It is clear that, at the limit, a single dedicated register may suffice for some particularly simple embodiments of the invention.

Similarly, a method in accordance with some embodiments of the invention may dispense with the use of a hardware processor module MMT and detect stack overflows in software (notably by means of the operating system at the time of context switching)—the only non-standard hardware elements used then being the dedicated register or registers.

Figure 2:
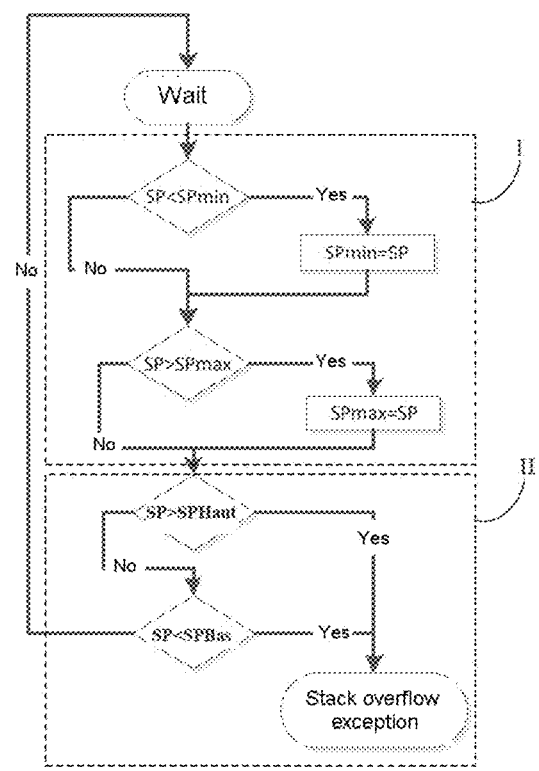
In FIG. 2, a flowchart of hardware processing in accordance with one embodiment of the invention.

In the FIG. 1 embodiment, the hardware processor module MMT performs the processing shown in FIG. 2.

It is considered that, at the time of the creation of the process currently being executed, the values SP, SPMin and SPMax have been initialized by assigning them a value $SP_{INIT}$ corresponding to the "bottom" of the stack; if the most current convention is used, whereby stacking entails decrementing SP, then $SP_{INIT}$=SPHaut. Thereafter, on each processor cycle, the processor verifies if the value of the stack pointer SP is less than the current value of SPMin, stored in the register RMin or SRMin. If so, SPMin is updated and becomes equal to SP. Thereafter, it is verified if the value of the stack pointer SP is greater than the current value of SPMax stored in the register RMax or SRMax. If so, SPMax is updated and becomes equal to SP. These two operations of comparison and assignment (in simplified embodiments only one may be present) constitute "part I" of the processing. Thereafter ("part II" of the processing) it is verified if SP>SPHaut or SP<SPBas (in simplified embodiments only one comparison may be present). If one of these conditions is verified, the module generates a stack overflow exception. Otherwise, processing resumes.

Synthesizing a hardware module implementing such processing does not present any particular difficulty to the person skilled in the art.

In certain embodiments, only part I of the processing may be present. In such a case: either overflows are detected in software (see FIG. 3B) or there is no such detection. In the latter case, overflows provoke delayed malfunctions, as in the prior art; however, the saved values of SPMin and SPMax enable the developer to understand a posteriori the origin of these malfunctions and to remedy it. Even in the absence of any overflow, studying the values of SPMin and SPMax at the end of the various processes makes it possible to optimize the allocation of memory for the stacks.

In other embodiments only part II of the processing may be present, in order to provide fast detection of stack overflows. However, in this case, little information is obtained able to assist a developer in sizing the stacks.

Figure 3A:
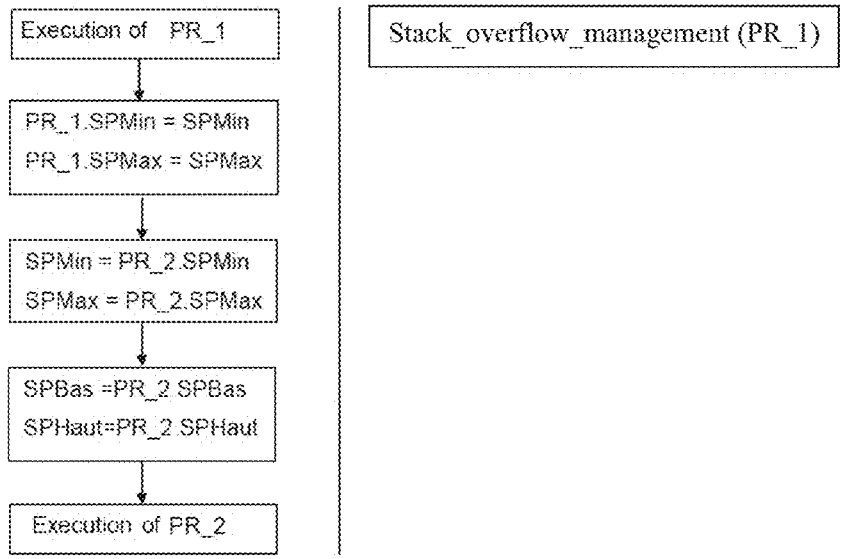
In FIGS. 3A and 3B, flowcharts of methods in accordance with two embodiments of the invention respectively employing hardware detection and software detection of stack overflows; and In FIG. 4, a schematic showing the organization of the memory of a computer implementing a method in accordance with one embodiment of the invention.

FIG. 3A shows the operations effected by the processor P under the control of the operating system at the time of context switching that occurs when a process PR_1 is suspended and another process PR_2 is activated.

Initially, the process PR_1 is currently being executed. Any overflows of its stack are detected by the hardware module MMT and managed by the Stack_overflow_management(PR_1) service of the operating system; furthermore, the values of SPMin and SPMax are constantly updated by the same processor module, as explained above. When PR_1 must be suspended, the operating system stores the latest values of SPMin and SPMax, contained in the dedicated registers RMin and RMax in context variables PR_1.SPMin and PR1.SPMax. Then, SPMin and SPMax assume their new values, based on the variables PR_2.SPMin and PR2.SPMax contained in the context of PR_2; moreover, the values SPBas and SPHaut stored in the context variables of PR_2 named PR_2.SPBas and PR_2SPHaut are loaded into the dedicated registers RBas and RHaut (the order of these operations is of no importance). Context switching then continues in the conventional manner.

If the hardware processor module MMT is configured only to implement part I of the processing (and therefore does not include the registers RHaut and RBas), overflows may be detected in software. So as not to slow down program execution excessively, this detection is then effected only at the time of context switching, as shown by the FIG. 3B flowchart. This figure shows that, when the process PR_1 must be suspended, the operating system compares SPMin to PR_1.SPBas and SPMax to PR1.SPHaut and, where necessary, triggers an overflow exception (execution of the Stack_overflow_management service, having PR_1 as a parameter). Thereafter, as before, the current values of SPMin and SPMax are saved in the context of PR_1 (to be more precise: in the region of the memory intended to save data characterizing the context of PR_1) and their new values are loaded into the registers RMin and RMax from the context of PR_2. Context switching then continues in the conventional way.

Note that, in the FIG. 3A embodiment, overflows are detected immediately by the hardware module MMT, even before unwanted writing has occurred. In the FIG. 3B embodiment, on the other hand, overflows are detected only on suspension of the process that caused the error, after data may have been corrupted in a potentially irreversible manner.

It will be noted that, in all cases, the invention uses both hardware means (dedicated registers, module MMT) and software means (operating system and compilers, the latter being responsible for determining the values of SPHaut and SPBas). The use of a hardware—rather than software—processor module makes it possible to detect the stack overflows and/or to measure the real use of the stack space by the processes without unduly slowing down their execution. Furthermore, hardware control is not sensitive to software errors. The fact that the operating system is involved in the control of overflows of the ordinary processes (and not a program with the same order of privilege, as in the case of some known prior art techniques) also contributes to the reliability of the technique of the invention.

Figure 3B:
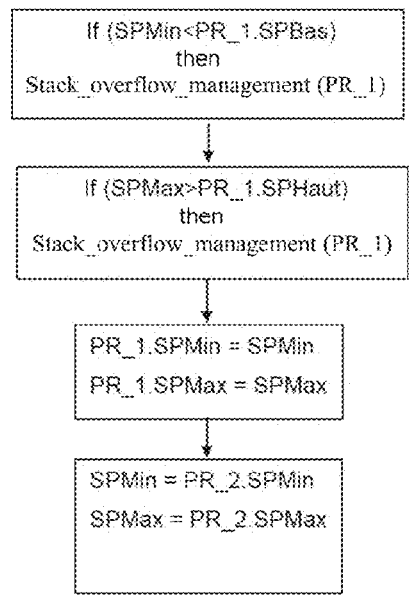

FIGS. 3A and 3B relate to the situation in which the processes PR_1 and PR_2 are ordinary processes executed in user mode, but apply equally, mutatis mutandis, to the situation in which it is a question of privileged processes executed in supervisor mode; in the latter case, overflows are processed in hypervisor mode.

Figure 4:
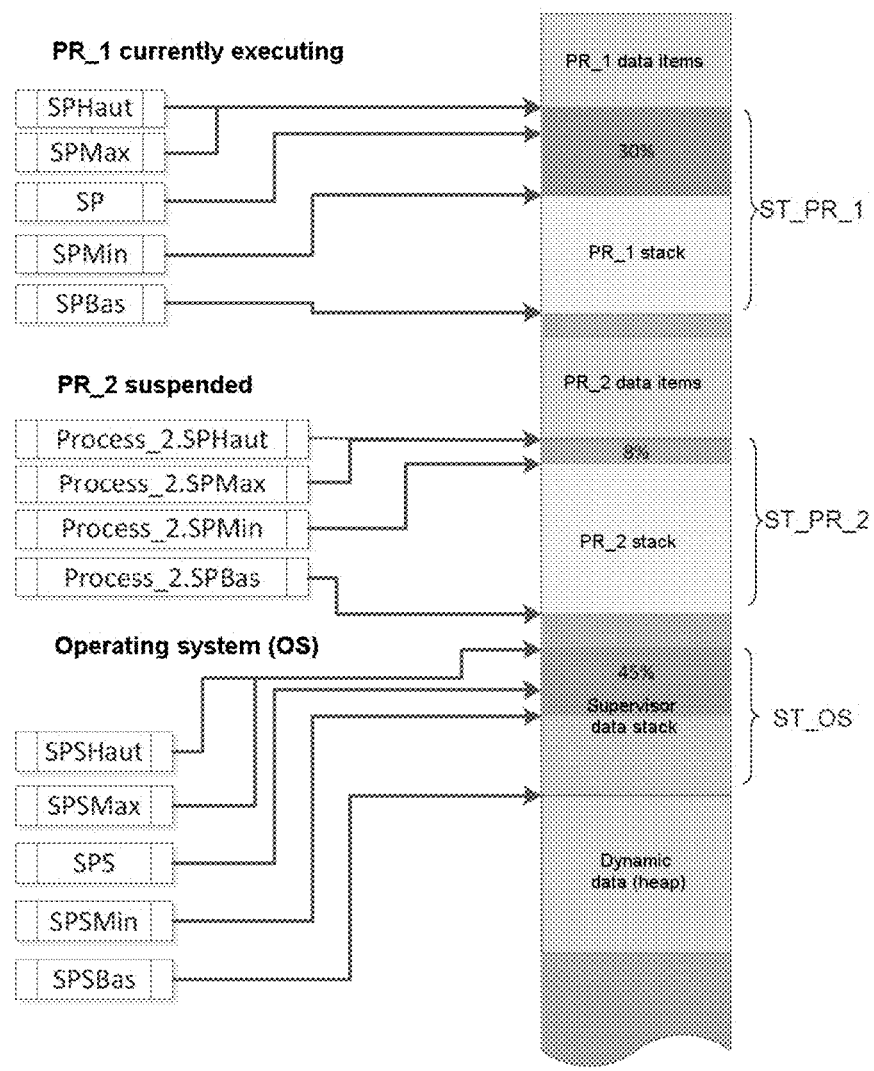

FIG. 4 shows the organization of the memory MEM when implementing a method in accordance with the invention. From top to bottom are seen a region allocated to the storage of global data, the stack ST_PR1 allocated to the process PR_1 currently being executed, the stack ST_PR2 allocated to the process PR_2 that is suspended, the stack ST_OS allocated to the operating system OS and a "heap" intended for storing dynamic data.

In the case of the stack ST_ PR1, it is seen that SPMin=SPBas, which means that the tack pointer SP has reached—but not passed—the lower limit of the stack; on the other hand, SPMax<SPHaut, which means that the memory allocated to the stack has not been used completely; to be more precise, in the example shown in the figure, 30% of the memory reserved for the stack of PR_1 is used (the percentage of memory used is 8% for the process PR_2 and 45% for the OS). As the process is currently being executed, these values are stored in the registers RMin, RBas, RSP, RMax and RHaut, respectively.

The values of SPHaut, SPBas, SPMax and SPMin are saved in the context of the process PR_2, to be more precise in the variables PR_2.SPHaut, PR_2.SPBas, PR_2.SPMax, PR_2.SPMin, respectively; these values will be loaded into the corresponding dedicated registers at the time of the activation of the process.

As for the operating system OS, the values SPSHaut, SPSBas, SPS, SPSMin and SPSMax are stored in the dedicated registers SRHaut, SRBas, SRSP, SRMin and SRMax, respectively.

The reliability of the invention, the absence or virtual absence of penalties in terms of execution time, and the simplicity of the hardware and software means employed make it particularly suitable for onboard applications, for example in avionics. Moreover, onboard processors have a relatively simple hardware and software architecture (operating systems) and are frequently based on programmable logic components. These features facilitate the modification of a pre-existing architecture to enable implementation of the invention.

The invention claimed is:

1. A method of detecting stack overflows, comprising the following steps:
   A. storing, in at least one dedicated register, at least one of: a first data item indicating a maximum permitted value for a stack pointer, and a second data item indicating a minimum permitted value for said stack pointer;
   B. effecting a comparison between a current value or a past value of said stack pointer and at least one of said first data item and said second data item;
   C. generating a stack overflow exception if said comparison indicates that said current or past value of said stack pointer is greater than said maximum permitted value or less than said minimum permitted value;
   A1: storing in at least one other dedicated register at least one of: a third data item indicating a maximum value assumed by a stack pointer during an execution of a thread or process and a fourth data item indicating a minimum value assumed by said stack pointer during execution of said thread or process; and
   B1: continuously updating at least one of said third and fourth data items during an execution of said thread or process;
   wherein said step A1 is implemented by an operating system at an activation time of said thread or process and said step B1 is implemented by a hardware processor module during an execution of said thread or process, and
   wherein said step A is implemented by the operating system at the activation time of said thread or process and said steps B and C are implemented by said operating system at a context switching time for a suspension of said thread or process and an activation of another thread or process and comprise at least one comparison chosen from: a comparison between said first data item indicating the maximum permitted value for the stack pointer and said third data item indicating the maximum value assumed by said stack pointer at the execution time of the thread or process currently suspended and a comparison between said second data item indicating the minimum permitted value for the stack pointer and said fourth data item indicating the minimum value assumed by said stack pointer at the execution time of said thread or process currently suspended.

2. The method of claim 1, wherein said step A includes storing in two dedicated registers said first data item indicating the maximum permitted value for the stack pointer and said second data item indicating the minimum permitted value for said stack pointer, and said step B includes at least one comparison between a current value of said stack pointer and each of said first and second data items.

3. The method of claim 1, wherein said step A1 includes storing in two dedicated registers said third data item indicating the maximum value assumed by said stack pointer during the execution of said thread or process and said fourth data item indicating the minimum value assumed by said stack pointer during the execution of said thread or process.

4. The method of claim 1, wherein said step A is implemented by the operating system at the activation time of said thread or process and said steps B and C are implemented by the hardware processor module at the execution time of said thread or process, said step B comprising a comparison between a current value of said stack pointer and said at least one of said first and second data items.

5. The method of claim 1, wherein, at the activation time of said thread or process, said operating system recovers from a context of said thread or process to be activated at least one of said first, second, third, and fourth data items for storage in said at least one dedicated register or each of said at least one other dedicated register and at a context switching time for a suspension of said thread or process and an activation of another thread or process, said operating system saves said first, second, third, or fourth data items stored in one of said at least one dedicated register in the context of said thread or process currently suspended.

6. The method of claim 1, employing a first set of said at least one dedicated register and an equivalent second set of dedicated registers, wherein:
   at the activation time of the thread or process to be executed in a user mode, at least said step A is implemented by the operating system operating in a supervisor mode and using said first set of at least one dedicated register; and
   at the activation time of the thread or process to be executed in the supervisor mode, at least said step A is implemented by the operating system operating in a hypervisor mode and using the said equivalent second set of dedicated registers.

7. The method of claim 1, wherein said stack is a call stack.

8. A processor for implementing the method of claim 1, the processor including:
   a central processor unit;
   at least one register for storing the stack pointer;
   said at least one dedicated register for storing at least one of: the first data item indicating the maximum permitted value for said stack pointer and the second data item indicating the minimum permitted value for said stack pointer; and
   said at least one other dedicated register for storing at least one of: the third data item indicating the maximum value assumed by the stack pointer during the execution of the current thread or process and a fourth data item indicating the minimum value assumed by said stack pointer during the execution of said current thread or process; and
   the hardware processor module configured to update at least one of said third and fourth data items during the execution of said thread or process.

* * * * *